B. J. KAHN.
COMBINED CLIP AND SPACER FOR ELECTRIC CONDUITS.
APPLICATION FILED AUG. 3, 1920.

1,366,321. Patented Jan. 18, 1921.

Inventor
B. J. Kahn.
By
Attorney

UNITED STATES PATENT OFFICE.

BERNARD J. KAHN, OF DENVER, COLORADO.

COMBINED CLIP AND SPACER FOR ELECTRIC CONDUITS.

1,366,321.  Specification of Letters Patent.  Patented Jan. 18, 1921.

Application filed August 3, 1920. Serial No. 401,025.

*To all whom it may concern:*

Be it known that I, BERNARD J. KAHN, a citizen of the United States, residing at the city and county of Denver and State of Colorado, have invented certain new and useful Improvements in Combined Clips and Spacers for Electric Conduits; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a device which will both hold and space electric conduits in construction of concrete buildings, so that the conduits may be properly embedded in the concrete, and from which the sheathing may be readily removed.

Briefly, the invention comprises a curved body portion to receive the conduit, said body portion having end plates extending laterally therefrom, said end plates having depending flanges, and one flange on each side having a wing adapted to be bent in under the conduit to retain it in the curved body member.

Figure 2:
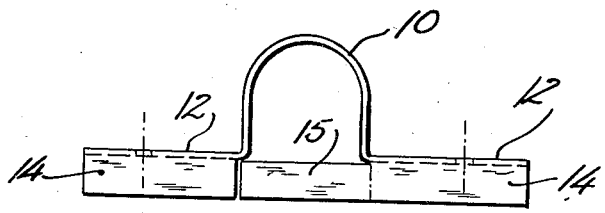
Fig. 2 is a side elevation of the device in operative shape.
Figure 3:
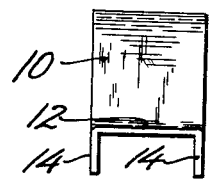
Fig. 3 is an end view thereof.

The body member 10 is curved to receive the conduit or pipe P, and end plates 12 extend from the lower ends of the arms of the body 10. These end plates are provided on both sides with depending flanges 14, one flange on each side having a wing 15 extending therefrom, said wing being adapted to be bent out into the position shown in Fig. 4 to receive the pipe and to be bent into the position of Figs. 2, 5 and 6, to retain the pipe or conduit.

Figure 1:
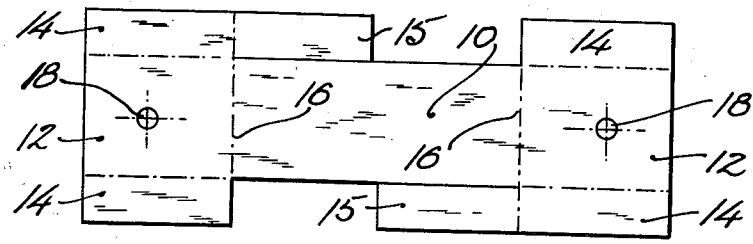
Figure 1 shows a blank from which the device is bent.

In Fig. 1 the lines upon which the end plates 12, and upon which the wings 15 are bent, are indicated in dotted lines 16. Each plate portion 12 is provided with an aperture 18 to receive a nail for securing the clip to the sheathing.

Figure 4:
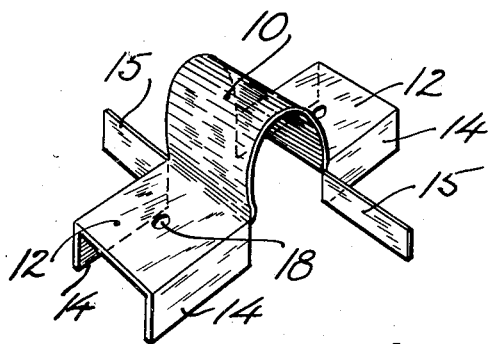
Fig. 4 is a perspective, showing the wings bent out to receive the conduit.
Figure 5:
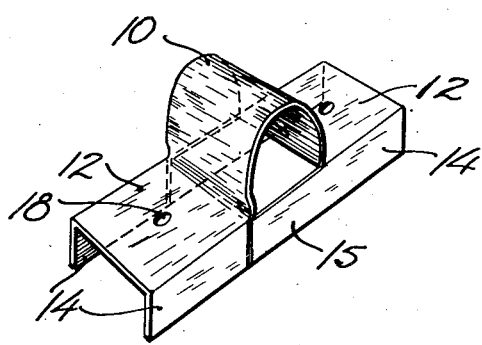
Fig. 5 is a perspective, showing the wings bent into operative position.
Figure 6:
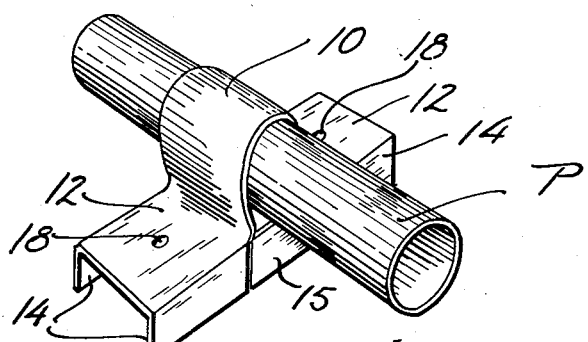
Fig. 6 is a perspective showing the conduit in position.

In using the device, the wings 15 are bent out into the position of Fig. 4. The conduit is then passed up between the body member 10 and said wings 15 are bent into position under the conduit in order to hold it in the member 10, as shown in Fig. 6. The clip is then placed on the sheathing and nails driven thereinto through the apertures 18. When the concrete is poured, the clip and the conduit are embedded therein, part of the concrete working into at least a portion of the space between the flanges 14. When the concrete is set and the sheathing is torn off, the nails projecting from the holes 18 are clenched over, the clenched portions and the lower edges of the flanges 14 and wings 15 being subsequently covered by the plaster or the like applied in finishing the building.

From the foregoing it will be seen that I have provided a device which will serve both the purpose of retaining the conduit in position for pouring the concrete so as to properly embed the same therein, and for preventing displacement of the conduit during other building and installing operations.

I claim:

1. A clip and spacer comprising a curved body member to receive a conduit, an end plate connected with said body member, and a wing connected at one end with said end plate and having its other end free and adapted to be bent beneath the space within the body member to retain a conduit thereon.

2. A combined clip and spacer, comprising a body member having a conduit-receiving space therewithin, end plates extending laterally on opposite sides of said body member, and wings connected at one end with said end plates and extending under the space within said body member for the purpose of retaining the conduit therein and having their other ends free.

3. A combined clip and spacer, comprising a body member having a cavity therein to receive a conduit, end plates extending laterally on opposite sides of said body member, flanges depending on each side of each of said end plates, and a wing extending from a flange on each side of the clip and adapted to be bent under said cavity to retain the conduit in said cavity.

4. A combined clip and spacer, comprising a body member of inverted U-shape, and plates extending laterally on opposite sides from the lower ends of the arms of the U, flanges depending from both sides of each plate, a wing extending from one of said flanges on each side of the devices, said wings being adapted to be bent inwardly beneath the space within the U-shaped member to retain a conduit in said U-shaped member.

In testimony whereof I affix my signature.

BERNARD J. KAHN.